Figure 1:
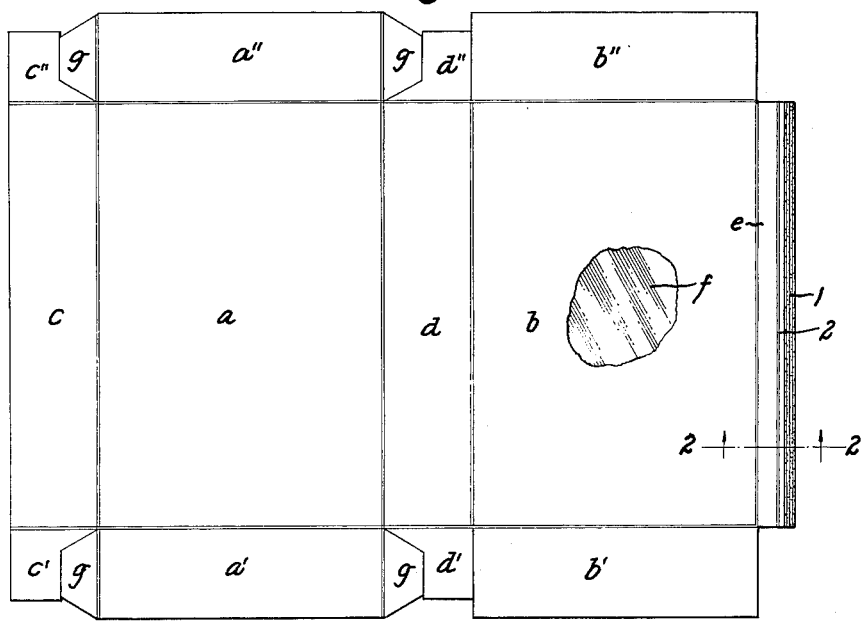

Aug. 3, 1965   R. J. HICKIN ETAL   3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD

Filed Sept. 18, 1962   14 Sheets-Sheet 1

INVENTORS
Robert J. Hickin
Frank N. Hackman
Sylvester M. Heinz
BY
ATTORNEY

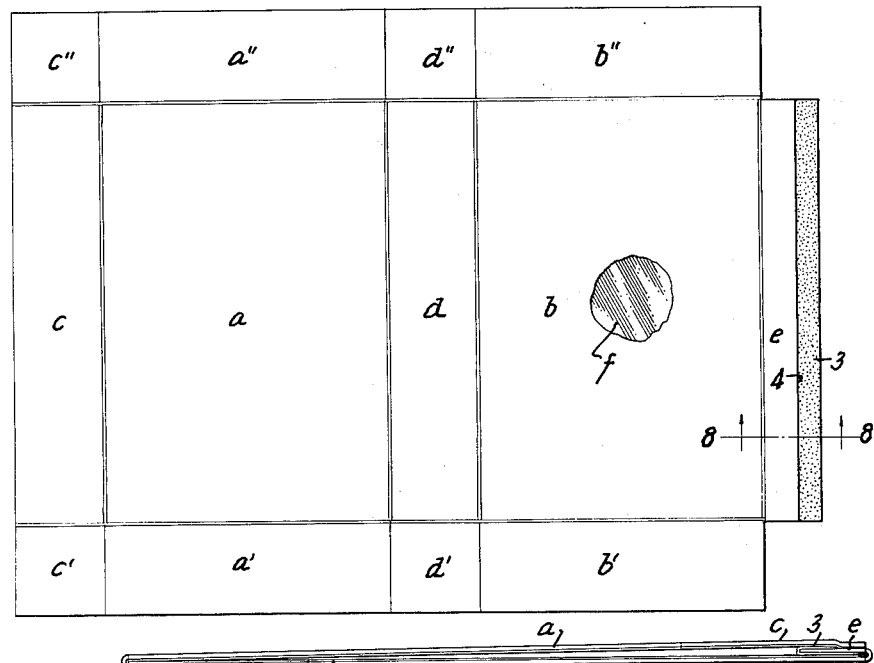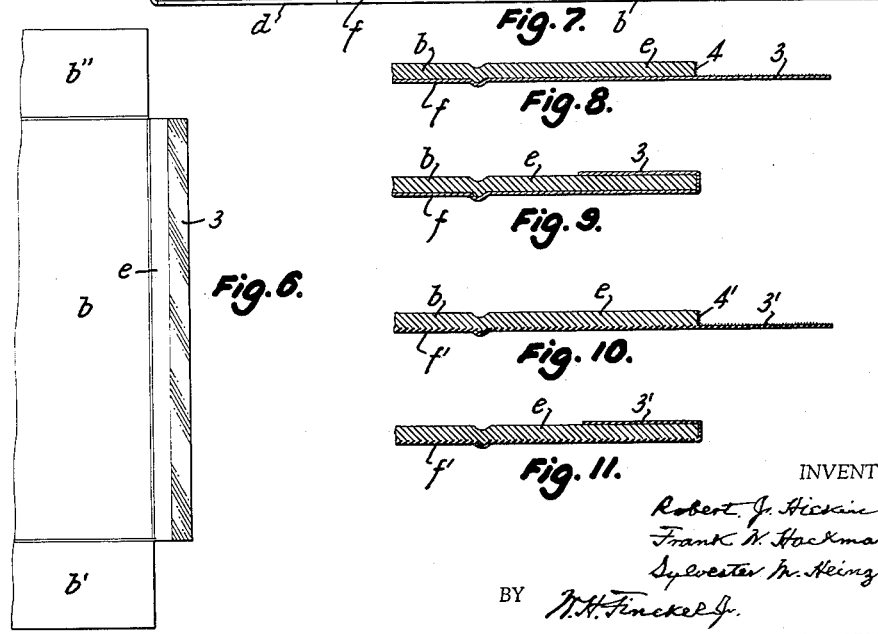

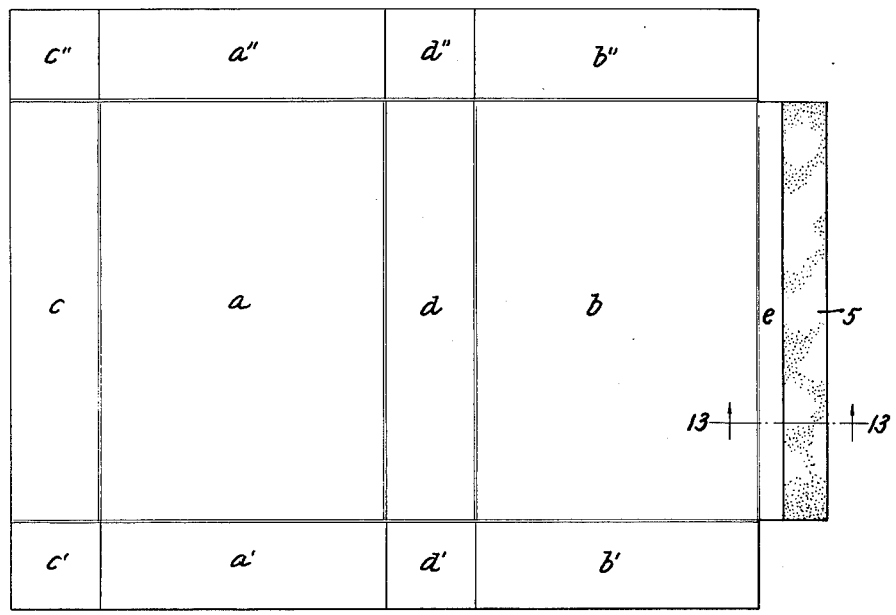
Fig. 12.
Fig. 13.
Fig. 14.
Fig. 15.
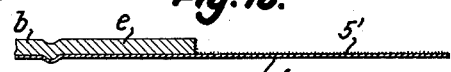
Fig. 16.
Fig. 17.
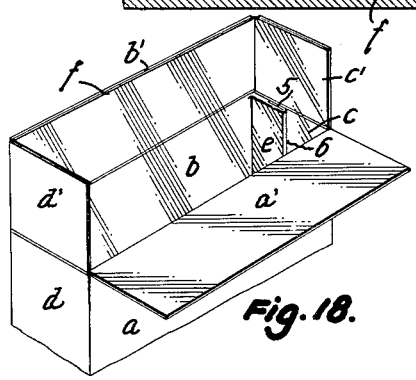
Fig. 18.
INVENTORS
Robert J. Hickin
Frank W. Hackman
Sylvester M. Heinz
BY
W. H. Finckel Jr.
ATTORNEY Aug. 3, 1965    R. J. HICKIN ETAL    3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962    14 Sheets-Sheet 4

INVENTORS
Robert J. Hickin
Frank W. Hackman
Sylvester M. Heinz
BY
W. H. Finckel Jr.
ATTORNEY Aug. 3, 1965 R. J. HICKIN ETAL 3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962 14 Sheets-Sheet 5
*Fig. 23.*
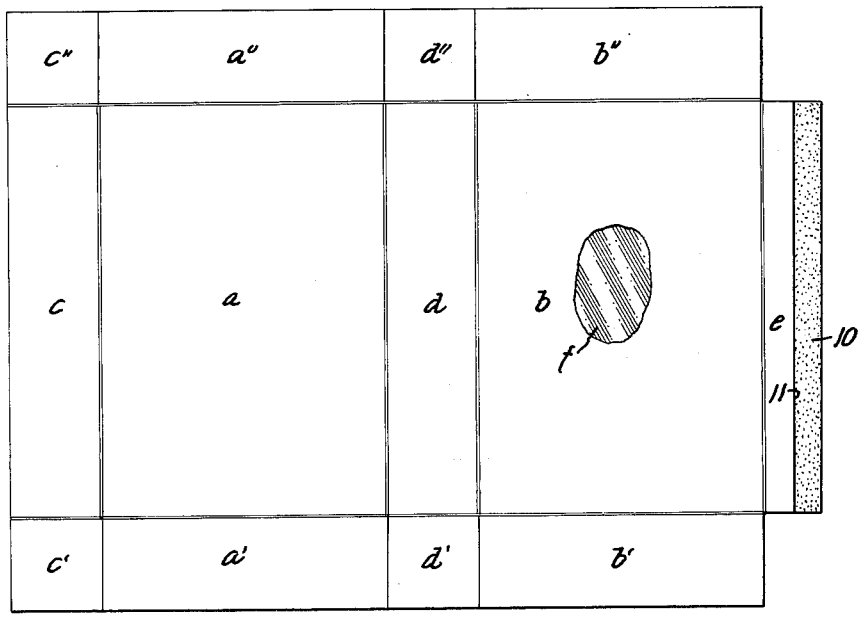
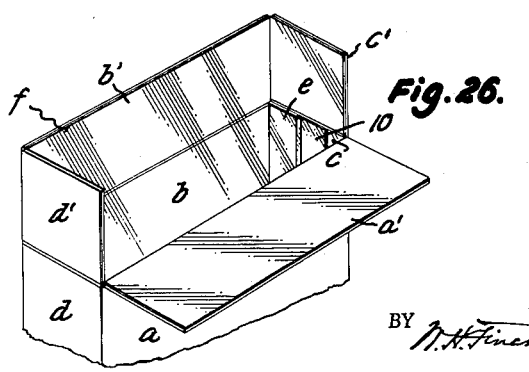
INVENTORS
Robert J. Hickin
Frank W. Hackman
Sylvester M. Heinz
BY
ATTORNEY Aug. 3, 1965     R. J. HICKIN ETAL     3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962     14 Sheets-Sheet 6

INVENTORS
Robert J. Hickin
Frank W. Hackman
Sylvester W. Hoing
by W.H. Finckel Jr.
ATTORNEY Aug. 3, 1965 R. J. HICKIN ETAL 3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962 14 Sheets-Sheet 7
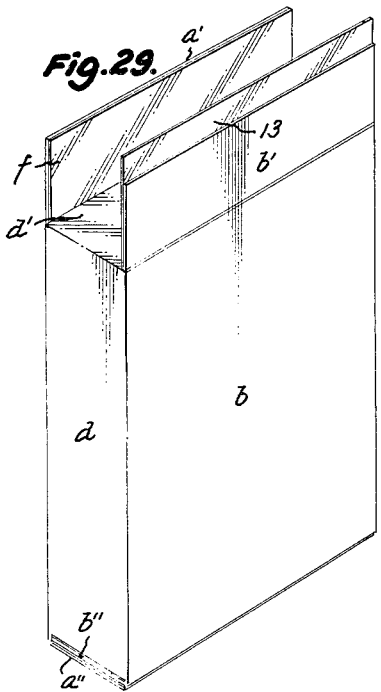
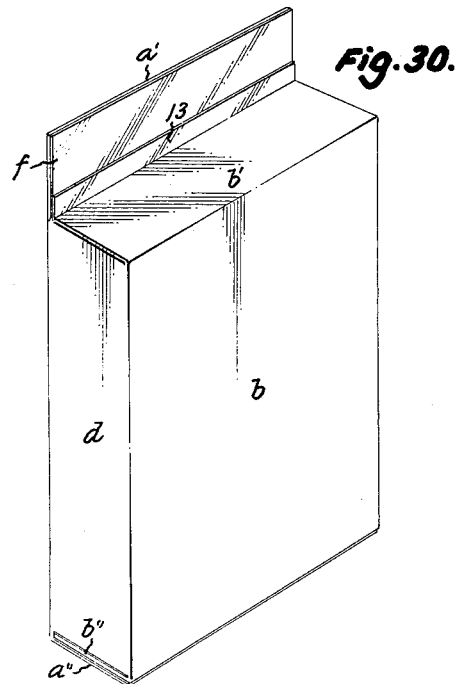
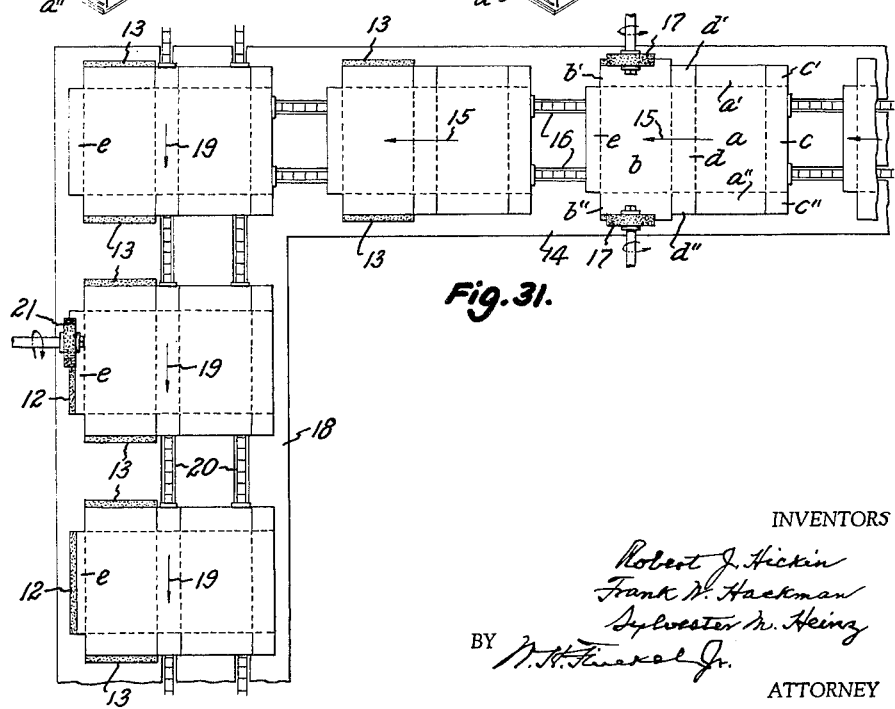
INVENTORS
Robert J. Hickin
Frank W. Hackman
Sylvester M. Heinz
BY
ATTORNEY Aug. 3, 1965  R. J. HICKIN ETAL  3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD Filed Sept. 18, 1962  14 Sheets-Sheet 8

INVENTORS
Robert J. Hickin
Frank N. Hackman
Sylvester M. Heinz
by W. H. Finckel Jr.
ATTORNEY

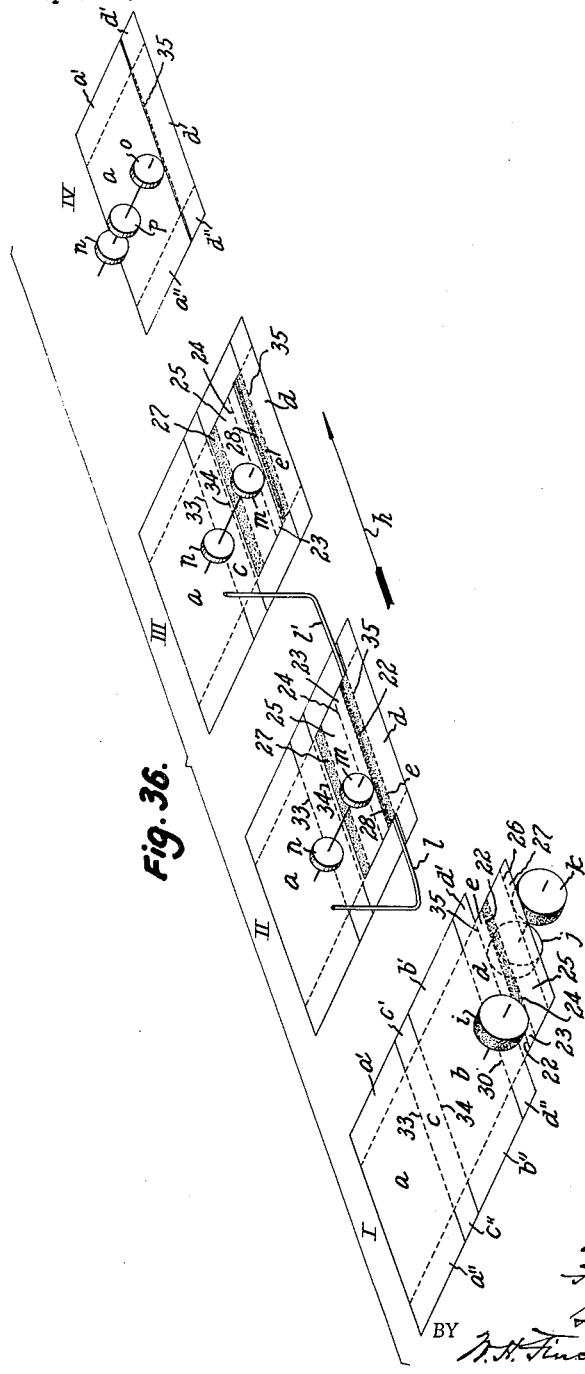

Aug. 3, 1965 R. J. HICKIN ETAL 3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962 14 Sheets-Sheet 10
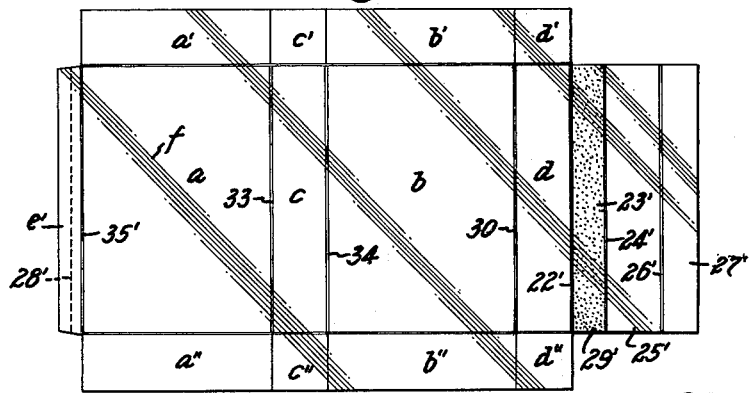
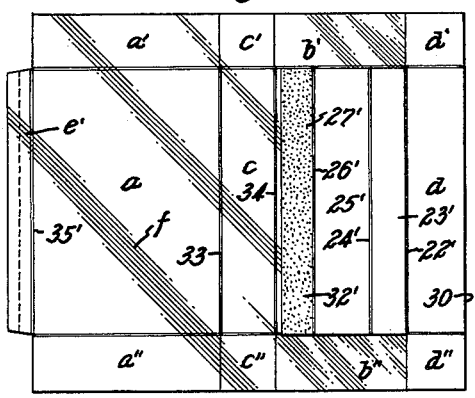
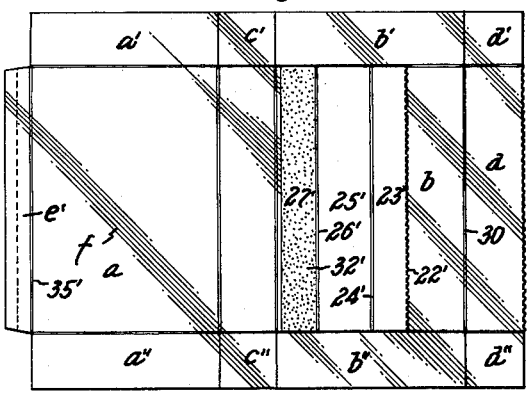
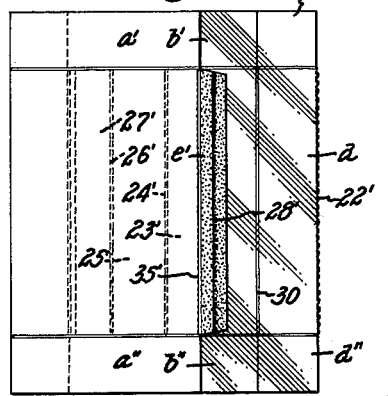
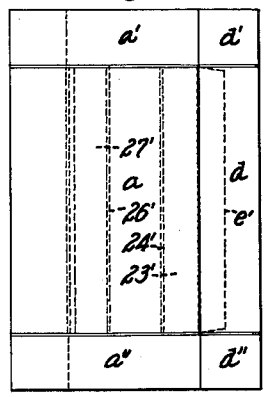
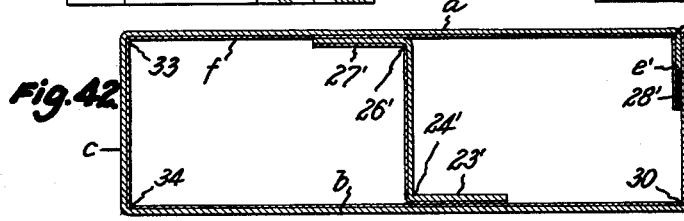
INVENTORS
Robert J. Hickin
Frank N. Hackman
Sylvester M. Heing
by N. H. Finckel Jr.
ATTORNEY

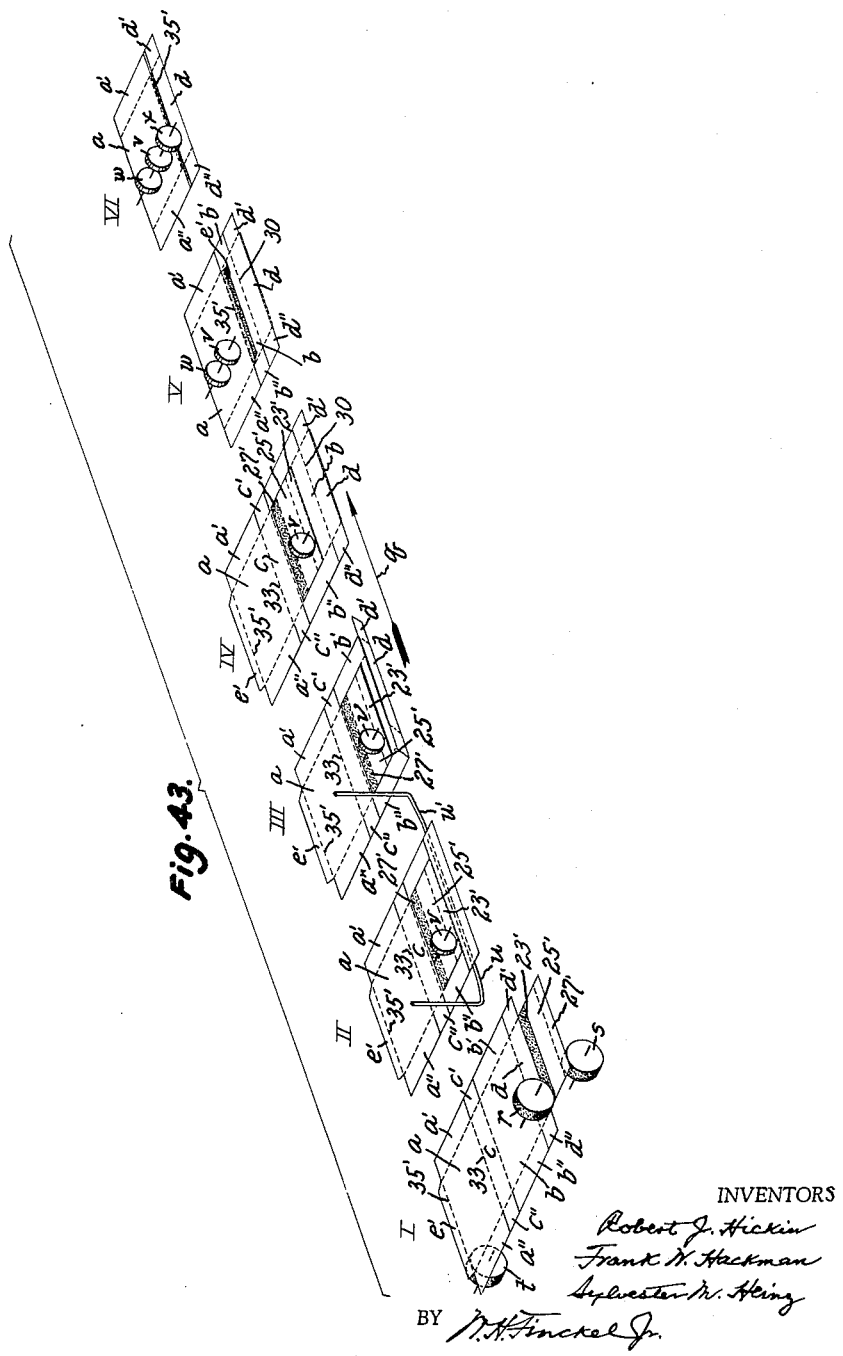

Aug. 3, 1965 R. J. HICKIN ETAL 3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962 14 Sheets-Sheet 12
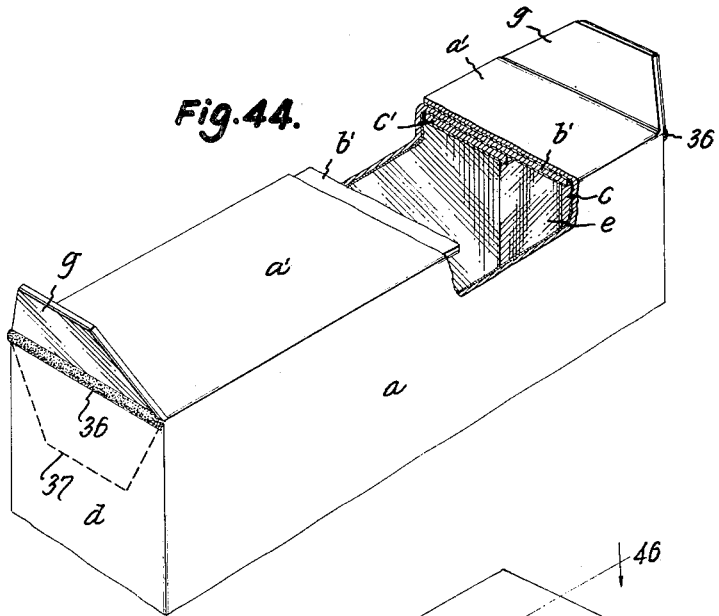
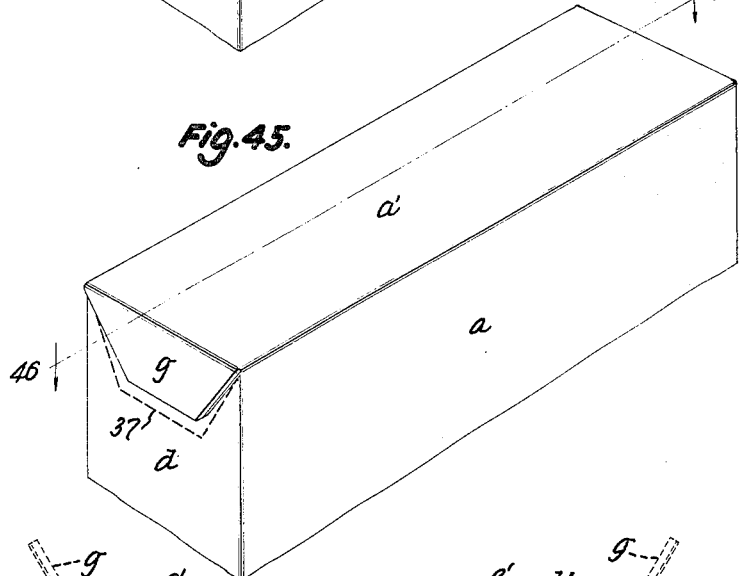
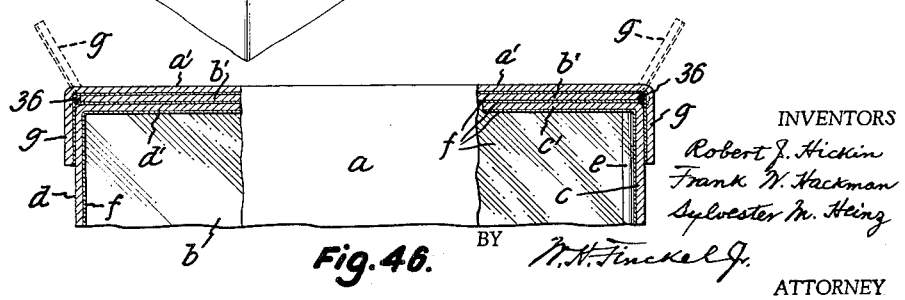
INVENTORS
Robert J. Hickin
Frank W. Hackman
Sylvester M. Heinz
BY W. H. Finckel Jr.
ATTORNEY Aug. 3, 1965         R. J. HICKIN ETAL         3,198,416
METHOD OF PREVENTING WICKING AND MOISTURE AND VAPOR
ABSORPTION AND PENETRATION IN PAPERBOARD
CARTONS, AND CARTONS PRODUCED
BY SUCH METHOD
Filed Sept. 18, 1962                    14 Sheets-Sheet 13
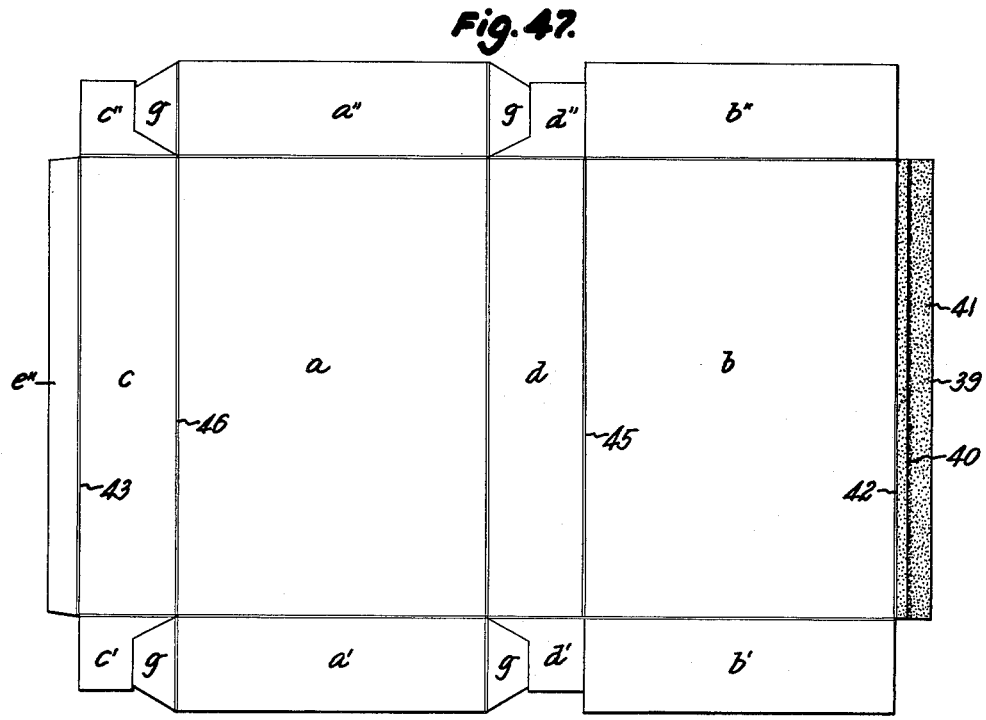
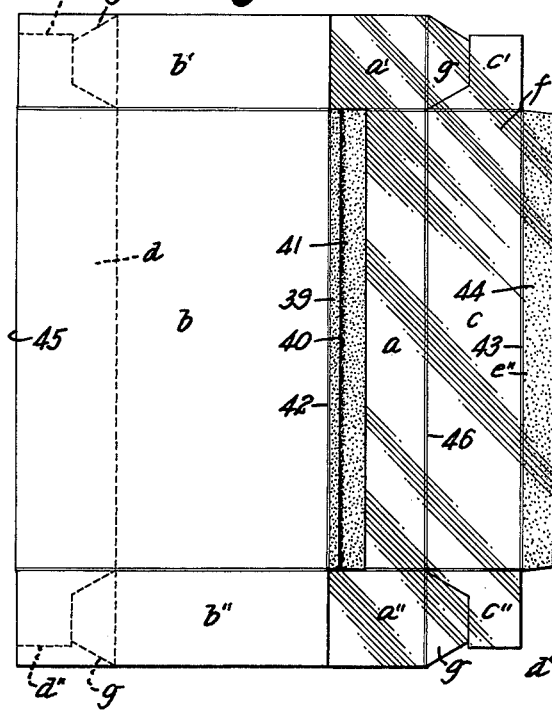
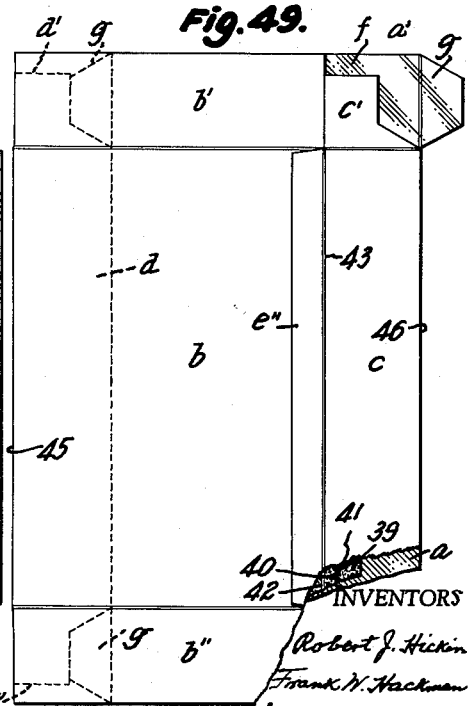
INVENTORS
Robert J. Hickin
Frank W. Hackman
Sylvester M. Heing
BY
W. H. Truckel Jr.
ATTORNEY

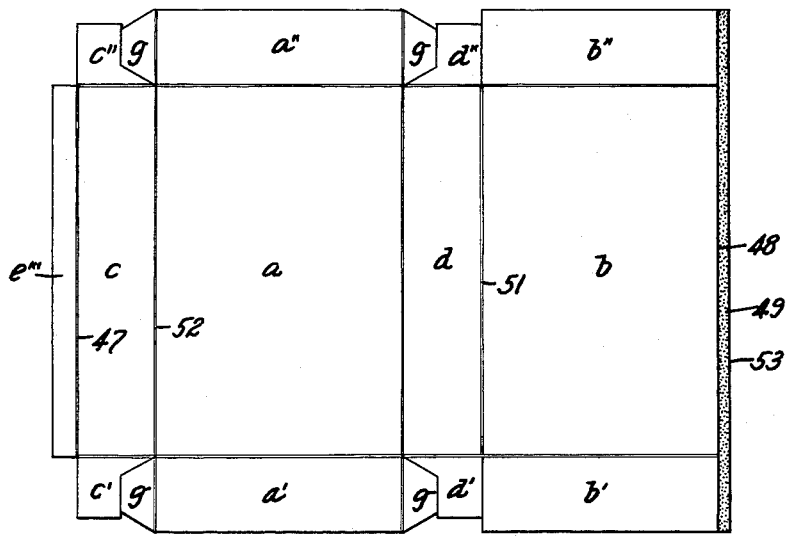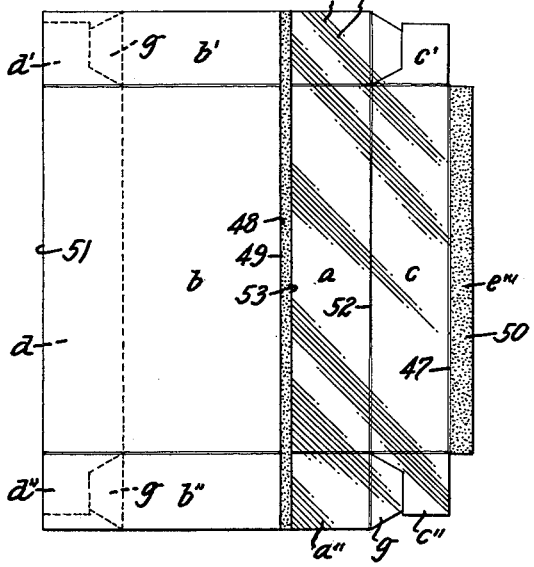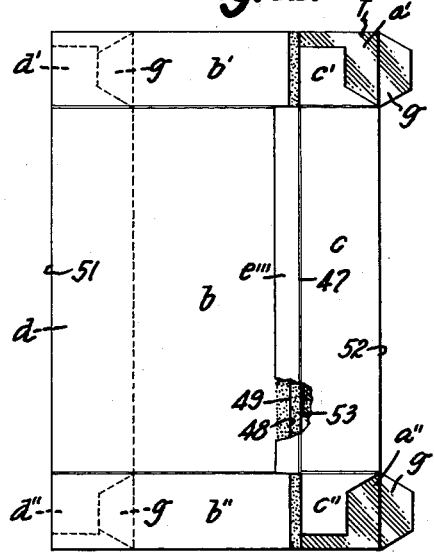

3,198,416
METHOD OF PREVENTING WICKING AND MOISTURE AND VAPOR ABSORPTION AND PENETRATION IN PAPERBOARD CARTONS, AND CARTONS PRODUCED BY SUCH METHOD
Robert J. Hickin, Seville, Frank W. Hackman, Wooster, and Sylvester M. Heinz, Rittman, Ohio, assignors to Packaging Corporation of America, Dover, Del., a corporation of Delaware
Filed Sept. 18, 1962, Ser. No. 224,464
10 Claims. (Cl. 229—14)

This invention relates to the packaging art, and it has special reference to the containers employed therein, particularly cartons of the folded blank type made of paperboard and similar sheet material of a somewhat porous or bibulous nature, the ends of which cartons are usually closed and sealed by flaps relatively folded, and adhesively secured, in juxtaposed condition.

In the packaging of powdery, granular, and flaky materials in cartons of this general type it is practically impossible to prevent sifting of the contents thereof through voids in the end closures which are due to imperfect sealing of the end closure flaps. Also, as a result of such imperfection, infestation of the carton contents is apt to occur, and such infestation poses a major problem particularly in the packaging of foodstuffs. Moreover, where such cartons are employed in the packaging of deliquescent or efflorescent materials or substances, or materials or substances which would deteriorate because of absorption or loss of moisture, imperfect sealing of the cartons will result in spoilage of the carton contents.

Various packaging expedients have been resorted to for correcting these faults of sifting, infestation, and absorption or loss of moisture, such as overwraps, and overall exterior plastic, or wax, coatings for the flap-sealed cartons, and the cartons have also been provided with interior bag-like containers to produce packages of the so-called "bag-in-box" type in which the bags containing the contents of the packages are hermetically closed and sealed.

But, in the packaging art a primary consideration of the packager is to obtain cartons which, as unitary structures, will, when closed and sealed by the relatively simple line-production closing and securing of the end closure flaps, produce packages which are sift-proof, infestation-proof and proof against the entrance or loss of moisture. Obviously, the use of such cartons can materially reduce packaging costs not only in respect to the cost of the cartons themselves but also in respect to packaging line operation as compared to packaging practices employing the expedients hereinbefore referred to, as examples, all of which require additional, and relatively expensive, package-forming materials or elements, and additional packaging line operations.

Moreover, with the possible exception of the "bag-in-box," such expedients, even with their added costs, have been found in practice to give questionable, or little if any, satisfaction in overcoming the package faults which they are designed to correct.

When an overwrap is used, and it may be either opaque and printed with a customary display, or transparent to reveal the display printed on the underlying carton walls, sifting of the package contents may occur within the overwrap, or when the overwrap is broken away for access to the carton the thus sifted contents will produce an objectionable spill. Moreover, when sifting occurs within a transparent overwrap it causes the package to become unsightly by obscuring, or hazing-over, the printed display on the underlying carton walls, and when an opaque overwrap is broken away the package becomes unsightly due to exposure of the usually bare, unlined or undecorated exterior of the carton walls. Furthermore, where sifting occurs there could also be infestation and absorption or loss of moisture in the packaged goods unless the nature and seal of the overwrap are such as to prevent them, which latter is rarely the case.

As in the case of overwraps, overall plastic or wax coatings are not only expensive but are seldom wholly effective, due either to voids occurring by reason of faulty application of the coatings or to cracking or chipping which may occur as a result of shipping or handling.

The primary objection to the "bag-in-box" type of package is its cost and its handling during the packaging operation.

In accordance with the invention covered by Patent No. 3,007,376, granted November 7, 1961, in which the present Robert J. Hickin is joined with Daniel C. McCollough as an inventor, and in their application for patent for Sealed Carton, filed January 17, 1961, Serial No. 83,310, now Patent No. 3,140,809, which is a division of the application for said patent, a paperboard-carton package can be produced which, in actual commercial production running into the millions of cartons, has been found to properly meet all tight-package requirements, being sift-proof and infestation-proof, and presenting an almost wholly effective moisture-vapor barrier.

In accordance with the said patented invention the carton is of the folded blank type, preferably, but not necessarily, made, commercially, from paperboard sheet stock the ultimate inner face of which is provided with a liner of grease and moisture-repellant material which may be either of lamellar sheet form, or a coating, to provide a grease and moisture-vapor barrier, the nature of such liner, and indeed its presence or absence, being dictated by the inherent characteristics of the commodity to be packaged. The carton is closed at its ends by conventional end-closure flaps folded into juxtaposed assembly and adhesively secured, and edges of the flaps in areas or zones where voids might, and often do, occur have applied to them strip-like deposits of a normally non-setting, plastic adhesive substance which serves to close such possible voids and seal the carton against sifting and infestation and supplement, or nearly complete, the effectiveness of the moisture-vapor barrier. In cartons of the type in which certain of the end-closure flaps are provided with Van Buren ears which are folded over upon and secured to adjacent side walls, the strip-like deposits of non-hardening plastic adhesive are applied to flap edges in areas adjacent to the folding scores of such ears and hence, when the ears are folded over upon and secured to the adjacent side walls, the plastic adhesive will not only be covered and concealed by the ears but will be forced, by folding of the ears, into any voids which may be present.

As is well known, a folded blank carton is so designed that, when its blank is folded flat to provide its ultimate tubular form, one terminal edge of the blank, which is provided with a glue flap, is secured to the other terminal edge of the blank by such glue flap. Thus, although the blank may be provided with a liner which is both grease proof and moisture and vapor repellent, the cut, or raw, terminal edge of the glue flap or the said other terminal edge of the blank (depending, primarily, upon whether the glue flap is secured as an inside or an outside glue flap, respectively), presents an area of unprotected paperboard which, although relatively small, may absorb or wick grease from greasy or oily packaged commodities, such, for example, as cake mixes, fried potatoes, and others, with the result that the grease is carried by absorption, saturation or penetration, into adjacent areas of the carton walls, and often to the outer surface thereof where it is unsightly and reduces the sales appeal of the package, and may also at least partially obscure or damage the usual printed display on the carton wall. Also, the raw edge of the glue flap, or of the said terminal edge of the blank, presents an unprotected, bibulous area which may to some extent defeat the moisture-vapor tightness of the package.

It will be understood that the terminal edges referred to are the long edges of the flap, and blank, and although the short edges at the ends of the flap and blank are also cut, raw edges they are not so subjected to absorption as the long edges for the reason that they can be so tightly contacted by the sealed end flaps as to preclude objectionable wicking contact with the carton contents.

Various expedients have in the past been suggested to cure these defects of absorption or wicking in such areas, and of moisture and vapor penetration, but those now known are thought to be either too inefficient, or too costly from the carton manufacturing standpoint, to be proper for practical application.

The object of the present invention is, therefore, to provide a method and means for correcting this fault in cartons, and the cartons embodying the improvements resulting therefrom.

To this end the invention comprises a method of preventing or arresting the passage of moisture or vapor, and the absorption or wicking of grease or oil, into bibulous portions of paperboard cartons, particularly at the joined edges of the blanks therefor and thence to a carton wall, which comprises the steps of removing, or skiving, from an edge-adjacent portion of the carton blank, which is ultimately associated with the inner wall surface of the carton, or specifically from said glue flap, an increment of the thickness of the paperboard of said blank to thereby expose the paper fibers of the blank, applying to said edge portion and to said exposed fibers, preferably during the operation of folding and gluing the blank, a substance preferably of an adhesive nature, which has such properties as will enable it to impregnate, or provide a sealing barrier on, the exposed fibers to an extent sufficient to arrest the passage of moisture and vapor and prevent the absorption or wicking of grease or oil, and adhering such edge portion, or specifically the glue flap, to a complemental carton wall preferably with the treated fibrous area of said edge portion in juxtaposition to said wall; and the invention comprises, also, numerous refinements in relation to preparation of such edge portion for reception of the impregnating or sealing substance, and relative disposition of parts of the edge portion subsequent to application of the said substance, such as the location of the skived area with relation to said edge portion, the depth and width of the skived increment and its surface characteristics, and, in some instances, the folding of the edge portion adjacent to, or including, such skived area prior to its adhesive attachment to the complemental carton wall; and, furthermore, the invention comprises the application of the skiving principle to parts of cartons other than a wall edge portion or a glue flap, or similar secured element, whereby a relatively thin, foldable sealing flap or flap extension may be produced, all as will be explained hereinafter more particularly and finally claimed.

Figure 2:
Figure 4:
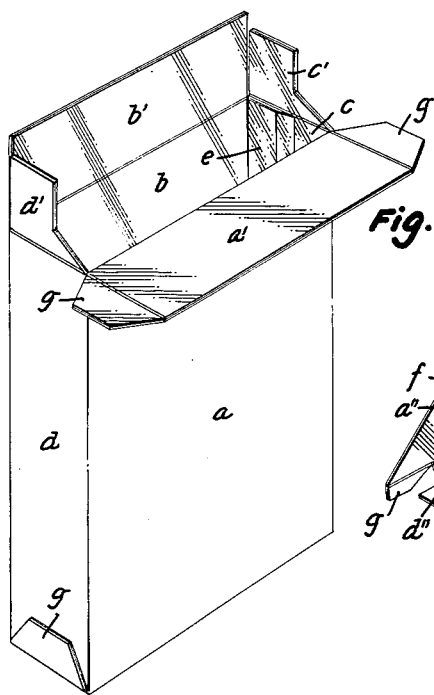
Figure 3:
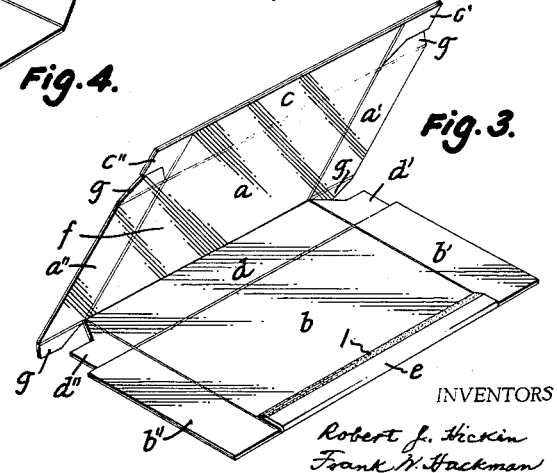
Figure 19:
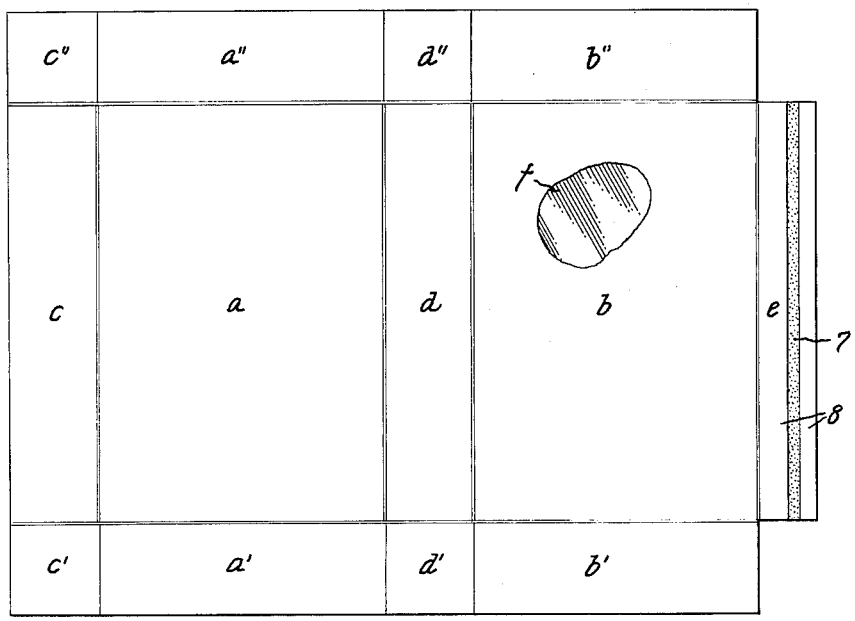
Figure 20:
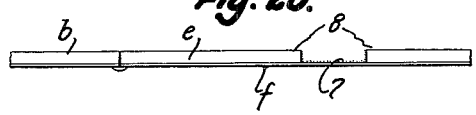
Figure 21:
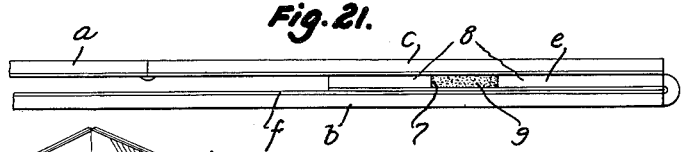
Figure 22:
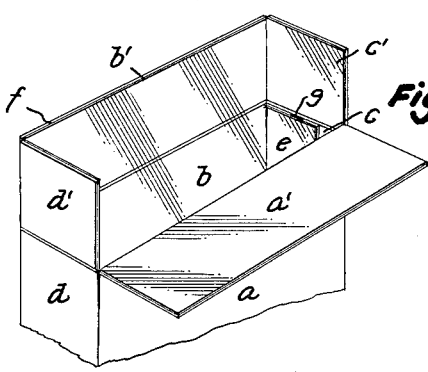
Figure 27:
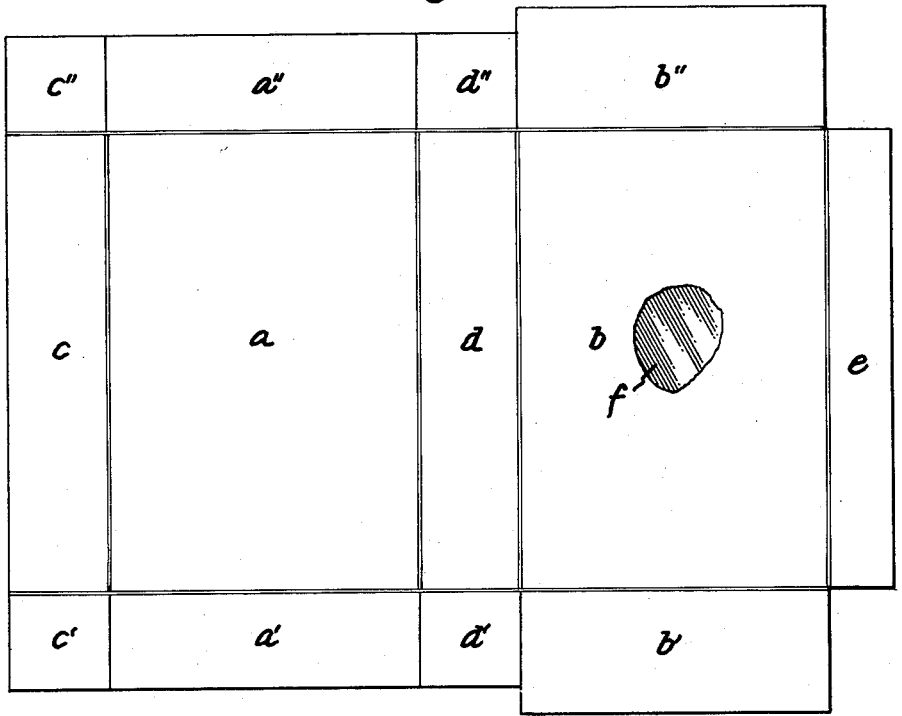
Figure 28:
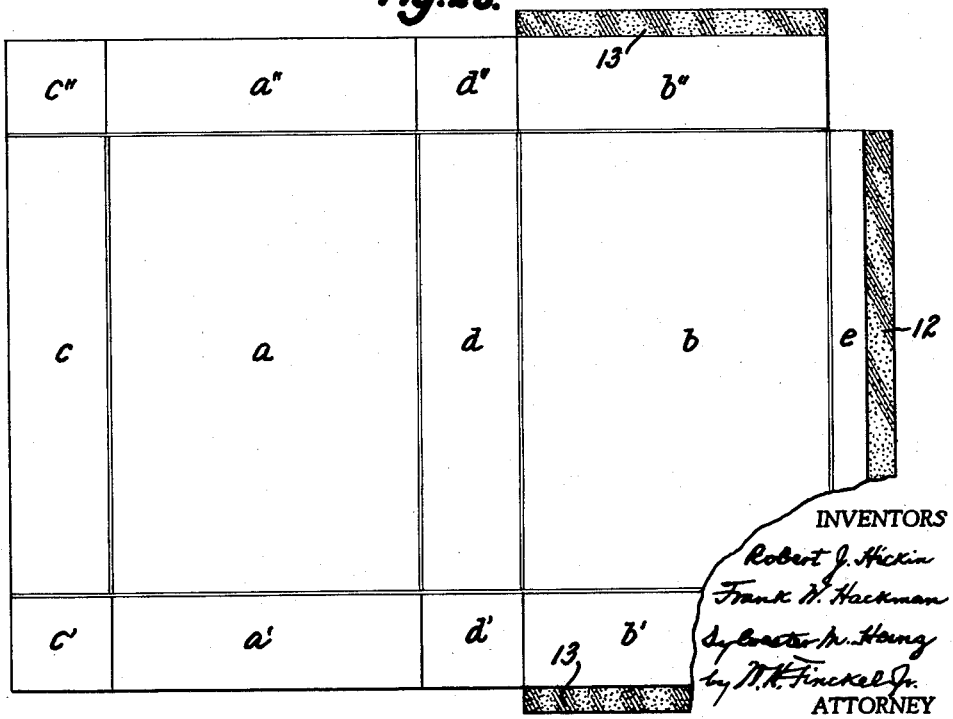
Figure 32:
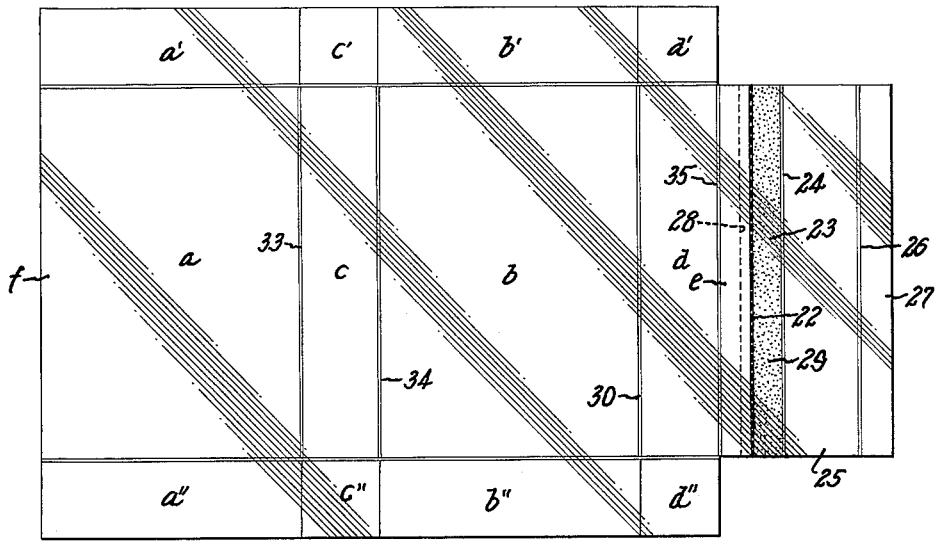
Figures 33, 34:
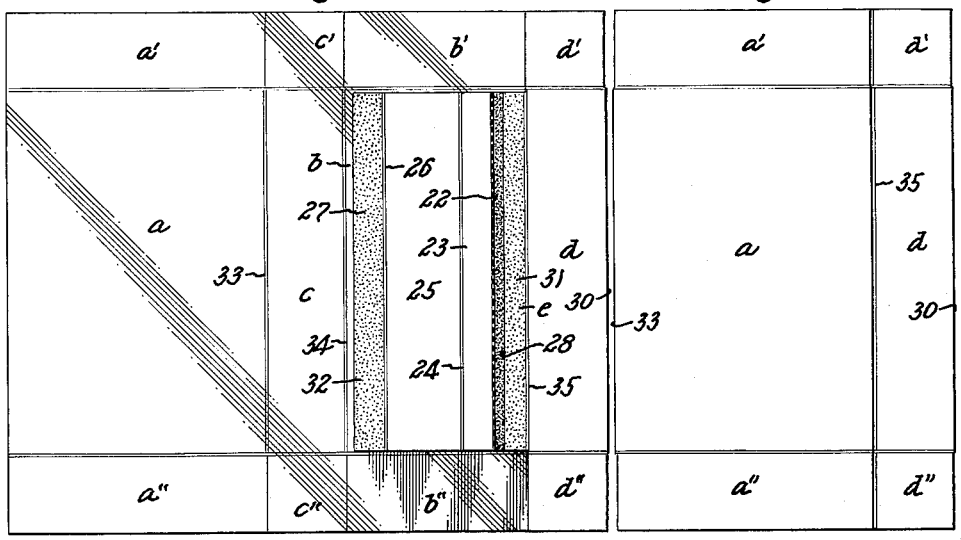
Figure 35:
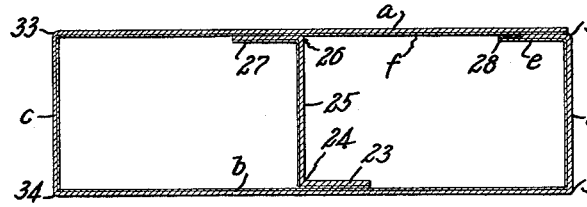

In the accompanying drawings illustrating the invention, in the several figures of which like parts are similarly designated, FIG. 1 shows, in plan, the outer face of a carton blank embodying one mode of practicing the invention, a portion of the blank being broken away, FIG. 2 is a greatly enlarged fragmentary section taken on the line 2—2 of FIG. 1, FIG. 3 shows, to a reduced scale, in perspective, the inner face of the blank of FIG. 1 with its glue flap flat-folded and the second fold of the blank initiated, FIG. 4 shows a carton erected from the blank of FIG. 1 with the end flaps at one end closed and sealed and those at the other end open, FIG. 5 shows, in plan, the outer face of a carton blank different from that shown in FIG. 1, and illustrating another mode of practicing the invention, a portion of the blank being broken away, FIG. 6 is a fragmentary plan view of edge-adjacent parts of the blank of FIG. 5 with the skived liner portion of the flue flap folded over and secured to such flap, FIG. 7 is an edge view of the flat-folded and glued blank of FIG. 5, FIG. 8 is a greatly enlarged fragmentary section taken on the line 8—8 of FIG. 5, FIG. 9 is a view similar to FIG. 8 but showing the skived liner portion of the glue flap folded over and secured to such flap, substantially as illustrated in FIG. 6, FIG. 10 is a view similar to FIG. 8 but differing therefrom in that the liner is formed by a coating applied to the inner face of the board of the blank, whereas in FIG. 8 the liner is shown as a lamellar sheet, FIG. 11 is a view similar to FIG. 9 but related to the showing of FIG. 10, FIG. 12 is a view similar to FIG. 5 but showing another modification of the skiving practice of the invention, FIG. 13 is a greatly enlarged fragmentary section taken on the line 13—13 of FIG. 12, FIG. 14 is a view similar to FIG. 13 but showing the skived portion of the glue flap folded back upon itself, FIG. 15 is a fragmentary section similar to that of FIG. 14 but showing a completed glue joint between the glue flap and an adjacent complemental carton wall, FIG. 16 is a view similar to FIG. 13 but showing the depth of the skived area extending to the liner sheet or layer of the paperboard of the blank, FIG. 17 is a view similar to FIG. 16 but showing the liner sheet or layer folded upon itself and secured, FIG. 18 is a fragmentary perspective view of one end of a carton made from a blank having the structural characteristics of that shown in FIGS. 12 to 15, FIG. 19 is a view similar to FIGS. 5 and 12 but showing a further modified embodiment of the invention in which the skived area of the glue flap is disposed adjacent to but inwardly of the longitudinal edge of such flap, to thus provide adjacent to both edges of the skived channel so formed coplanar areas of the flap for attachment to the complemental carton wall, FIG. 20 is an enlarged fragmentary edge view of the right-hand portion of the blank of FIG. 19, FIG. 21 is a view similar to FIG. 20, but reversed edge-for-edge, showing the glue flap in-folded and attached to the complemental carton wall, FIG. 22 is a fragmentary perspective view of one end of a carton formed from the blank of FIGS 19 to 21, FIG. 23 is a view similar to FIGS. 5, 12 and 19 but showing a blank embodying another modification of the invention in which the skived portion of the glue flap provides an offstanding thin guard or lip portion preferably constituted in thickness by the paperboard liner, whether it be in the form of a lamellar sheet or a coating, for direct adhesive union with the complemental carton wall, FIG. 24 is a greatly enlarged fragmentary edge view of the right-hand portion of FIG. 23, FIG. 25 is a view similar to FIG. 24, but reversed edge-for-edge, showing the glue flap in-folded and it and its lip portion attached to the complemental carton wall, FIG. 26 is a fragmentary perspective view of one end of a carton made from the blank of FIG. 23, FIG. 27 is a plan view of the outer face of a carton blank similar to that of FIGS. 5, 12, 19 and 23 but embodying modification of certain of the end closure flaps to accommodate skiving to furnish thereon foldable extensions for inclusion in the sealing assembly of the end flaps, FIG. 28 is a veiw similar to FIG. 27 but showing the blank after performance of the flap-skiving operation, FIGS. 29 and 30 are perspective views of the carton made from the finished blank of FIG. 28; FIG. 29 showing the two broad end flaps upstanding and FIG. 30 showing the broad end flap carrying the extension folded down with its extension bearing against the inner face of the other broad end flap in such association as to be sealingly folded therewith down against the previously folded broad flap, FIG. 31 is a schematic view illustrating apparatus and method suitable for performance of the skiving operation on blanks of any of the forms shown in FIGS. 1, 5, 12, 19, 23 and 27, and particularly on blanks of the FIG. 27 form to make the conversion thereof shown in FIG. 28, FIG. 32 is a plan view of the inner face of a blank for forming a partitioned carton in which the partition element is provided as a frangible extension of the glue flap, the glue flap itself being skived to form a wicking barrier in substantially the manner illustrated in FIG. 19 to 22, FIG. 33 is a view similar to FIG. 32 but showing the first fold of the blank in which the glue flap and its frangible partition element are flat-folded against an adjacent broad side wall, FIG. 34 is an exterior plan view of the completely flat-folded and glued carton blank of FIGS. 32 and 33, FIG. 35 is an enlarged transverse section of the squared-up carton of FIG. 34 showing the attached glue flap, and the partition element secured to the opposite broad side walls in the position assumed by it when the carton is squared up, FIG. 36 is a schematic view illustrating, diagrammatically, a method and apparatus for folding and gluing the partitioned carton blank of FIGS. 32 to 35 and for freeing the frangible partition element from the glue flap during such folding and gluing operation, FIG. 37 is a view similar to FIG. 32 but showing the blank for a partitioned carton in which the frangible partition element is attached to a wall panel rather than to a glue flap, FIG. 38 shows the first fold of the elements of the blank of FIG. 37, FIG. 39 shows the partition element secured to a carton side wall panel and freed along its line of fracture from the wall panel to which it was originally attached, said last named panel being folded outwardly, FIG. 40 shows the third fold of the blank in which the glue flap is brought into position for securement thereto of the wall panel last mentioned in relation to FIG. 39, FIG. 41 shows the final fold of the blank with the said last mentioned wall panel secured to the glue flap, FIG. 42 is an enlarged transverse section of the partitioned carton squared up from the folded blank of FIG. 41, FIG. 43 is a schematic view similar to FIG. 36, but illustrating, diagrammatically, a method and apparatus for performing the folding and gluing operations on carton blanks of the type shown in FIGS. 37 to 41, FIG. 44 is an enlarged fragmentary perspective view, with parts in section, showing a carton blank of the type illustrated in FIG. 1, but modified as to details, and illustrating the application of a sealing or calking compound beneath the Van Buren ears of the last-folded end closure flap, such ears being shown in raised position, FIG. 45 is a view similar to FIG. 44 but showing the Van Buren ears closed down and sealed against the adjacent narrow side walls, FIG. 46 is a sectional elevation taken substantially in the plane of line 46—46, FIG. 45, and showing the Van Buren ears in broken lines in raised position similar to the showing of FIG. 44.

FIG. 47 is a plan view showing the outer face of a carton blank generally similar to that of FIG. 1 but including structural and assembly modifications, FIG. 48 is a view of the blank of FIG. 47 reversed face for face and showing the first assembly fold, FIG. 49 is a view similar to FIG. 48 but showing the second, final, flat blank assembly fold, parts being broken away at one corner to show underlying parts.

FIGS. 50, 51 and 52 are views essentially similar to FIGS. 47, 48 and 49, respectively, but showing a further modification of the blank of FIG. 1.

Preliminary to consideration of a detailed description of the various embodiments of the invention herein disclosed, it should be borne in mind that a factor of major importance in the production of cartons, namely the cost factor, has been one of the primary considerations in the development of the invention, and its novel features are of such a nature as to make possible their embodiment in carton blanks of a wide variety of types and produced from accepted kinds of sheet material, specifically paperboard.

Also, in view of the fact that the invention is directed to the control of wicking, or absorption, or penetration of moisture, vapor, grease or oil into raw edges of the paperboard exposed interiorly of the carton, it is preliminarily essential to the effective practice of the invention that the sheet stock from which the carton blanks are formed be provided with a moisture, vapor and/or grease repellent liner layer on its face which forms the several interior surfaces of the carton. Such a liner layer may comprise one or more sheets of glassine or similar substantially impervious or pergameneous stock laminated onto the paperboard sheet, or it or provides a sub-surface impregnation of, the sheet. Moreover, in the interest of economy, this liner should form a part of the sheet stock from which the carton blanks are cut prior to the cutting operation, thus avoiding the problems of blank register which have in the past resulted from attempts to combine pre-cut linear sheets with mating carton blanks.

It will be noted, as will be pointed out in more detail hereinafter, that in accordance with the invention the carton blanks having liners which, in effect, are integral parts thereof, and are coextensive in area therewith, may be handled as integers and operated upon in accordance with the invention during the blank folding and gluing operation.

These refinements in composition and handling of the blanks made possible by the practice of the invention result in the production of blanks embodying the protective features of the invention at only slightly increased cost, if any, over production of blanks lacking such features, and it will be understood that any such increase in cost will be offset by the advantages obtained over cartons formed and produced from blanks made in accordance with presently accepted practices.

The primary object of the invention being, as hereinbefore pointed out, the protection of the raw or cut edges of the paperboard which are exposed interiorly of the carton and in contact with the carton contents, and particularly the longitudinal edge of a wall panel or of the glue flap, it will be apparent that the practice of the invention is not restricted to cartons of any particular style but is rather of substantially general application.

Moreover, although a number of specific embodiments of, or modes of practicing, the invention are herein disclosed, and are shown in relation to cartons formed from blanks of numerous accepted types, it will be understood that, with a few exceptions, any of such embodiments or modes can be employed, alternatively, with any selected types of cartons so long as the blanks therefor lend themselves to the practice.

Furthermore, although in the majority of the cartons herein disclosed the sealing of the end closure flaps may be relatively simple, it will be understood that such sealing may embody the practice covered by the aforementioned Hickin and McCollough Patent No. 3,007,376, or may include separately applied, or integral, sealing sheets adapted to be gusset-folded with the end closure flaps, as shown, for example, in the patents of Robson No. 1,279,589, September 24, 1918, Benzon-Peterson No. 2,795,364, June 11, 1957, Turpin No. 2,996,235, August 15, 1961, and others, or may have corner-sealing gusset means, as shown, for example in the patents of Gannon et al. No. 1,723,150, August 6, 1929, Wesselman No. 2,107,096, February 1, 1938, Benzon-Peterson, above referred to, and others. Also, various combinations of the sealing expedients of these patents may be made, and, if desired, at least one of the end closure flaps may be provided with so-called "Van Buren ears," as shown in the patents of Ash No. 1,223,232, April 17, 1917, Van Buren Nos. 1,863,259, 1,863,260, 1,863,261, June 14, 1932 and others.

It will be noted that the blanks of all of the cartons shown in the drawings as representative, merely, of styles in which the present invention may be embodied, are of the type formed from sheet material, such, preferably, as paperboard, suitably cut and scored in conventional manner to produce two broad side walls $a$ and $b$, two narrow side walls $c$ and $d$, and a glue flap $e$. Also, the broad side walls $a$ and $b$ are provided at their opposite ends end closure flaps $a'$, $a''$ and $b'$, $b''$, respectively, and the opposite ends of the narrow side walls $c$ and $d$ are provided with end closure flaps $c'$, $c''$ and $d'$, $d''$, respectively.

Except for the forms of blanks shown in FIGS. 32 to 35, and FIGS. 39 to 42, which have special attributes for provision of a partition member, and those shown in FIGS. 47 to 49, and FIGS. 50 to 52, which are of the outside glue flap type, all of the blanks shown are of the type in which the glue flap $e$ is attached to the outer longitudinal edge of the broad side wall $b$ and is foldable thereagainst during the gluing operation for attachment to the juxtaposed flat-folded edge portion of the inner face of the narrow side wall $c$, and hence is disposed interiorly of the finished carton.

As indicated in all of the figures of the drawings, with the exception of FIGS. 10 and 11, the inner face of each of the blanks is provided with a lamellar sheet or liner $f$ which produces a barrier for oil, grease, moisture and vapor, but this liner need not be of lamellar sheet form but may be a surface, or impregnating, coating $f'$, as indicated in FIGS. 10 and 11.

In FIGS. 1 to 4, and 44 to 52, the blanks for the cartons are of the type in which the end flaps of one of the broad side walls are provided with Van Buren ears $g$, but it will be understood that the inclusion of this detail is, as hereinbefore indicated, optional, and has no direct relation to the particular mode of treatment of the carton wall panels or glue flaps to provide their cut or raw edges with a barrier against wicking and moisture and vapor penetration in accordance with the invention.

Coming now to the several modes of practicing the invention as illustrated in the drawings, which, as hereinbefore mentioned, should be considered primarily as representative and not as excluding possible modifications, it will be seen that in FIGS. 1 to 4 the free longitudinal edge of the glue flap $e$ is skived on the outer face of the blank to produce a gradually sloping beveled or feather edge 1 which preferably terminates at, and does not extend into, the barrier layer or sheet $f$. This skiving removes a predetermined increment of the thickness of the paperboard in an adequate area inwardly from the edge of the glue flap and exposes the bibulous fibres of the paperboard throughout such area, as indicated by stippling. The skiving may be performed by a knived cutting wheel, or a grinding wheel, or other appropriate abrading means, and the skiving operation is preferably performed during the blank-folding and gluing operation, as hereinbefore indicated.

When, during such folding and gluing operation, adhesive is applied to the entire area (FIGS. 1 and 3) of the glue flap $e$, an amount of such adhesive will be absorbed by the fibres of the skived portion of the flap sufficient to impregnate or bond with the exposed fibres and thus seal the raw or cut edge of the flap. Inasmuch as the adhesive used will be of a type which is oil, grease, moisture and vapor repellent (and there are now many such adhesives commercially available in the category of natural and synthetic resin adhesives, and others), it will be apparent that this sealing of the raw or cut edge of the glue flap will make the edge substantially impervious, and effectively repellent, to oil, grease, moisture and vapor, and will provide the desired barrier at such edge to absorption or wicking of oil or grease from the carton contents and to passage of moisture and vapor.

Thus, with the interior of the carton protected by the barrier provided by the liner $f$, and the raw or cut edge of the glue flap sealed, as described, the faults usually present in such a raw or cut edge are overcome and the entire interior of the carton is made effectively impermeable.

If desired, a score 2 (FIG. 1) may be provided longitudinally of the glue flap $e$ adjacent to the inner edge of the skived area in order to facilitate and insure flat-gluing, or adhesion, of this skived area against the inner face of the narrow side wall $c$, see FIG. 4.

Having reference particularly to FIG. 4, it will be apparent, as hereinbefore intimated, that the short, transverse ends of the glue flap $e$ which present raw, cut edges are not treated for the prevention of wicking or penetration of moisture or vapor, but when the carton is closed and sealed these edges are in such intimate contact with the flaps $c'$, $c''$, which are held closed by the adhesively affixed flaps $b'$, $a'$ and $b''$, $a''$, that any entrance between them and the flaps $c'$, $c''$ of portions of the carton contents will be so minor, and so closely confined, as not to result in wicking of oil or grease, or penetration of moisture or vapor, to a deleterious extent. In fact, portions of the carton contents which thus enter will be so closely confined as to be held against escape from such confinement and any wicking of grease or oil into the said end edges of the glue flap therefrom will be so minor as to present no problem.

In the modification shown in FIGS. 5 to 11, it will be seen that the skiving of the longitudinal edge portion of the glue flap $e$ is such that a continuous band of the paperboard is removed down to the liner provided by the laminate $f$ (FIG. 8), or the depth of the coating $f'$ (FIG. 10), but preferably leaving some paper fibres offstanding from the liner. Thus the liner provides an extension 3 (FIG. 8) or 3′ (FIG. 10) which, after adhesive is applied to it and to the glue flap, will be folded over the raw or cut (skived) edge 4 (FIG. 8) or 4′ (FIG. 10) and secured to a longitudinal face portion of the glue flap, see particularly FIGS. 6, 9 and 11, thus serving to seal the said raw or cut edge. Here again, the presence of the adhesive saturated paper fibres offstanding from the extension 3 or 3′ will enhance the adhesive union of the folded extension with the adjacent face area of the glue flap $e$.

As shown in FIGS. 12 to 15, and 18, the skiving is made to such a depth that the increment of paperboard removed is equal to one-half the thickness of the sheet and provides an edge extension 5 (FIGS. 12 and 13) on the glue flap $e$ which, when folded upon itself (FIGS. 14, 15 and 18), will make the protected edge 6 of the glue flap the same thickness as the body of such flap, thus facilitating the folding of the glue flap and its adhesive securement against the inner face of the narrow side wall $c$ (FIG. 15) and presenting to the interior of the carton an edge fully protected by the liner $f$.

Alternatively, the skiving may remove an increment extending to the liner $f$, and the edge extension 5′ thus formed (FIG. 16) will be doubled back upon itself (FIG. 17).

In these modifications (FIGS. 12 to 15 and 18, and 16 and 17) it will be noted that the bibulous paper fibres exposed by the skiving operation on the extensions 5 and 5′ will serve to enhance the adhesive bond between the portions of the doubled extensions.

In the embodiment illustrated in FIGS. 19 to 22, the skiving operation is so performed and controlled as to produce a channel 7 spaced inwardly from the raw or cut edge of the glue flap e (FIGS. 19 and 20), and when, during the folding and gluing operation, adhesive is applied to the face 8 of the glue flap such adhesive will fill the channel 7, as indicated at 9, FIGS. 21 and 22. Thus, the adhesive at 9, which by its nature is oil, grease, moisture and vapor repellent, will provide a barrier between the raw or cut edge of the glue flap e and the broad side wall b and will thus serve to arrest the passage through the flap of oil, grease, moisture or vapor which, by wicking, absorption or penetration might enter the flap through its raw or cut edge.

The modification shown in FIGS. 23 to 26 is similar to that of FIGS. 5 to 11 insofar as the skiving operation is concerned, but instead of turning the extension 10 (FIGS. 23 and 24) back upon the glue flap, as is done in the FIGS. 5 to 11 embodiment, it is adhered during the folding and gluing operation to the inner face of the narrow side wall c (FIGS. 25 and 26) thus sealing the raw, skived edge 11 of the glue flap against wicking and absorption or penetration. It will be appreciated that here, also, the presence of bibulous paper fibres on the surface of the extension 10, which is intentional as hereinbefore mentioned, will aid in securing a good adhesive bond between this extension and the carton liner sheet or coating to which it is secured.

FIGS. 27 to 31 illustrate an embodiment of the skiving concept of the invention in which, in addition to protecting or sealing the raw or cut edge of the glue flap e by an extension 12 similar in form and function to those of FIGS. 1, 5, 12, 16, 23 and also 19, the first-folded end closure flaps b', b" of the broad side wall b may be provided with extensions 13 which will fold over the longitudinal edges of these flaps and between them and the last-folded end closure flaps a', a", see FIGS. 29 and 30.

To this end the flaps b' and b" are made of sufficient area to accomodate skiving along their longitudinal edges whereby the liner f will be exposed to produce the extensions 13. As shown in FIG. 31, this skiving operation may preferably precede that which produces the skived extensions 12, or fuctionally similar barrier means, on the glue flaps e. For example, as the flat blanks are fed along a platform 14 in the direction of the arrows 15, as by lugged conveyor chains 16, rotary cutters 17, such as knived or abrosive wheels, will remove the proper increments of the respective end closure flaps b', b" to thus provide the foldable extensions 13, and thereafter, upon transfer of the blanks to the platform 18, they will be fed in the direction of the arrows 19, as by lugged chains 20, at right angles to their former direction of feed, and into engagement with a rotary cutter 21, preferably similar to the cutters 17, which will remove the proper increments of their respective glue flaps e to produce the skived extensions 12.

Thus, by a relatively simple adaptation of the folding and gluing mechanism, the step of skiving the glue flap may be accompanied by the step of skiving the aforesaid end closure flaps, and the blanks can proceed from the glue flap skiving operation to the final folding and gluing steps to form the desired flat-folded, finished blanks.

In the embodiment shown in FIGS. 32 to 35 the invention is shown as applied to a carton provided with a partition which is formed as an extension to the glue flap and may be assembled therewith in proper adhesive union with opposed carton walls when the carton blank is flat-folded and glued, but which is frangible from the glue flap when the flat-folded and glued blank is squared up or during the folding and gluing operation, thus enabling it to assume its carton-body partitioning location.

Having reference to FIG. 32, in which the inner, lined face of the carton blank is shown, it will be seen that the blank comprises the broad side walls a and b, and the narrow side walls c and d all provided with their respective end closure flaps a', a"; b', b"; c', c", and d', d", these various elements being defined by appropriate customary cuts and folding scores.

As distinguished from the blanks shown in FIGS. 1, 5, 12, 19, 23 and 27, the blank of FIG. 32 has its glue flap e attached to the edge of the narrow side wall d, instead of to the edge of the broad side wall b, and is joined on a line of rupture 22, such as a series of cuts and scores, or perforations, with a glue tab 23 to which is attached on a folding score 24 a partition element 25 which carries on a folding score 26 a glue tab 27.

Bordering the line of rupture 22 the outer face of the glue flap e is skived to form a channel 28 similar to, and having the same function as, the channel 7 of the embodiment of the invention shown in FIGS. 19 to 22.

In folding and gluing this blank, adhesive is first applied to the inner face of the glue tab 23, as indicated by the stippling in FIG. 32, and then the narrow side wall d and the glue flap e with its attached glue tab 23, partition element 25 and glue tab 27, are folded upon the folding score 30 between the narrow side wall d and the broad side wall b flat against the inner face of the broad side wall b, as shown in FIG. 33, so that the glue tab will adhere to this broad side ball b substantially medially thereof. Then, with adhesive applied to the outer faces of the thus disposed glue flap e and glue tab 27, as indicated by the stippling at 31 and 32, respectively, in FIG. 33, with the adhesive also filling the channel 28, the broad side wall a is folded on the folding score 33 between it and the narrow side wall c flat against the glue tab 27, partition element 25 and glue flap e, so that the glue tab 27 will adhere to the inner face of the side wall a substantially medially thereof and the terminal edge portion of the side wall a will be adhesively joined to the glue flap e. This final folding is shown in FIG. 34.

When pressure is applied to the opposite edges of the thus flat-folded and secured blank on the folds at the folding scores 30 and 33, as is customary, the blank will square up on these folding scores and on the folding scores 34 and 35, and as it is thus erected the glue tab 23 will break away from the glue flap e on the line of rupture 22 so that the parts will assume the relative positions shown in enlarged section in FIG. 35.

It will be apparent, particularly by reference to FIG. 35, that the adhesive retained by the channel 28 will serve to seal the raw skived edge of this channel thus guarding against wicking, absorption or penetration of oil, grease, moisture or vapor at such edge.

As hereinbefore stated, severance of the partition element 25 from the glue tab 23 along the line of rupture 22 may be accomplished during the operation of folding and gluing the blank instead of as a function of the squaring up of the carton, and FIG. 36 depicts, schematically, one practical manner in which this may be done.

As the blanks are continuously fed, inner face up, in the direction of the arrow h, a top gluer i applies adhesive to the inner face of the glue tab 23, and two underneath gluers j and k apply adhesive to the outer faces of the glue flap e and the glue tab 27, respectively, the gluer j serving also to fill the channel 28, all as shown at station I. Next, as shown at station II, the narrow side wall d, with its attached glue flap e and partition elements 23, 25 and 27, is folded on its folding score 30, by a suitable plow or other conventional folding means, over and down upon the broad side wall b, with a fixedly supported rod or wire l interposed between this wall b and the glue flap e, and rollers m and n, of which there may be aligned pluralities, serve to ensure an adhesive bond between the glue tab 23 and the wall b, and to hold the blanks in proper feeding position.

It will be seen, also at station II, that the trailing end l' of the rod or wire l (namely the far end thereof in the direction of travel of the blank) is curved, or bent, upwardly from the plane of the blanks, and this serves to cause the rod or wire to automatically break the glue flap e away from the adhesively secured glue tab 23 along the line of fracture 22 during feeding travel of the blanks, as indicated at station III.

Finally, the broad side wall $a$ is folded on the folding score 33 by a plow or other conventional folding means, over, and down upon, the narrow side wall $c$ and the broad side wall $b$ which positions it, flat-folded over the parts 23, 25, 27 of the partition element, with its free edge in adhesive engagement with the already adhesive-supplied glue tab 27, whereafter, as the blanks pass beneath rollers $n$, $o$ and $p$, preferably in aligned pluralities, the rollers $o$ and $p$ will serve to maintain bonding pressure in line with the glue flap $e$ and glue tab 27, respectively, until the adhesive has set, all as indicated at station IV.

As thus assembled in flat-folded condition, with the partition element freed from the glue flap $e$ along the line of fracture 22 by action of the rod or wire $l$-$l'$, and connected only to the broad side walls $a$ and $b$ by the adhesive union therewith of the glue tabs 27 and 23, respectively, the flat folded blank may easily be squared up with the partition element disposed as shown in FIG. 35.

In the modified form of partitioned carton and blank shown in FIGS. 37 to 42 the essential parts of the blank are the same as those of the form shown in FIGS. 32 to 35, but are, in some respects, differently associated and hence differently folded and glued, as depicted in FIGS. 38 to 42, and schematically represented in FIG. 43.

As shown in FIG. 37, the glue flap $e'$ is attached on a folding score 35' to the edge of the broad side wall $a$, as distinguished from the glue flap $e$ of FIGS. 32 to 35 which is attached to the narrow side wall $d$, and the interconnected associated parts 23', 25', 27' of the partition element are attached by the glue tab 23' directly to the narrow side wall $d$ by a preformed line of fracture 22'.

In the folding and gluing of this modified form of blank, adhesive is applied to the glue tab 23' on its inner face as indicated by the stippling at 29' (FIG. 37), to the glue flap $e'$, pre-skived at 28', on its outer face, as indicated by the stippling at 31' (FIG. 40), and to the glue tab 27', on its outer face, as indicated by the stippling 32' (FIGS. 38 and 39). With adhesive thus applied, either simultaneously or sequentially, as desired, the narrow side wall $d$ with its attached partition element parts, is folded on the folding score 30 over and down upon the broad side wall $b$ with the said partition element parts lying flat against such side wall and the glue tab 23' secured to the mid-portion thereof by the adhesive 29' (FIG. 38). Next, the narrow side wall $d$ is separated from the thus adhesively affixed glue tab 23' along the line of fracture 22' and is turned back into substantially coplanar relation to the broad side wall $b$ (FIG. 39). Then the broad side wall $a$, carrying the glue flap $e'$ is folded on the folding score 33 over upon the narrow side wall $c$ and against the partition element parts adhesively affixed by the glue tab 23' to the broad side wall $b$, in which folded association the glue tab 27' will be adhesively joined to the mid-portion of the broad side wall $a$ by the adhesive 32', and the adhesive-carrying face of the glue flap $e'$ will be exposed (FIG. 40). Completion of the folding and gluing operation entails merely the folding of the narrow side wall $d$ on its folding score 30 over upon the broad side wall $b$ with its free edge portion overlying and adhesively secured to the glue flap $e'$ (FIG. 41). Pressure applied to opposite vertical edges of the thus assembled blank (FIG. 41) will square its parts up into the relative disposition shown in FIG. 42.

The schematic illustration in FIG. 43 of a method and apparatus for performing the just described folding and gluing operation is similar to that of FIG. 36 but modified for adaptation to the successive assembly steps involved.

The blanks advance in the direction of the arrow $g$, and at station I adhesive is applied by the top gluer $r$ to the inner face of the glue tab 23', and underneath gluers $s$ and $t$ apply adhesive to the outer face of the glue tab 27' and to the outer face of the glue flap $e'$, respectively, the gluer $t$ serving also to apply the adhesive to the skived portion 28' of the glue flap $e'$.

As a blank approaches station II the narrow side wall $d$ with the attached parts 23', 25' and 27' will be folded by a plow or the like over a fixedly supported wire or rod $u$ and down upon the broad side wall $b$, carrying with it over and against the said broad side wall the parts 23', 25' and 27' of the partition element, and pressure rollers $v$ will insure an adhesive bond of the glue tab 23' with the mid-portion of the said broad side wall. Further advance of the blank along the wire or rod $u$, the trailing end portion $u'$ of which is curved, or bent, upward, will serve to strip the narrow side wall $d$ free of the affixed glue tab 23' along the line of fracture 22' and the said narrow side wall will be outwardly folded, station III, by a plow or other means into substantially coplanar relation to the body of the blank, station IV.

At station V the broad side wall $a$ with attached glue flap $e'$ is shown folded on its folding score 33 over and down upon the narrow side wall $c$ and the parts of the partition element affixed to the broad side wall $b$ by the glue tab 23', thus bringing the mid-portion of the broad side wall $a$ into adhesive engagement with the glue tab 27', and pressure rollers $v$ and $w$ will insure adhesive bonds between the broad side walls $a$ and $b$ and the glue tabs 27' and 23', respectively.

The final steps of the operation, namely the folding of the narrow side wall $d$ over upon, and the adhesive securement of its edge portion to, the glue flap $e'$, is shown at station VI, and pressure rollers $x$ will be employed for insuring a proper adhesive bond.

In FIGS. 44 to 46 there is shown a practical application of the practice of the invention in combination with a preferred type of carton with which the sift-proof and infestation-proof method of the aforementioned Hickin and McCollough invention (Patent No. 3,007,376) is employed.

The carton here shown is of the general type illustrated in FIGS. 1 to 4 but includes a seal of the edge of the glue flap $e$ which is similar to that of FIGS. 5 to 11, or 12 to 17.

No contents are shown in the carton, but it is depicted in FIG. 44 with its end closure flaps $a'$, $b'$, $c'$ and $d'$ closed and adhesively secured, and it will be apparent that the whole interior of the carton, including the edge of the glue flap $e$, presents to the contents a surface completely covered by the liner $f$ and hence oil, grease, moisture and vapor proof, and not subject to wicking, absorption or penetration.

At the end edge of the closure flaps $a'$ and $b'$, and of their opposite end complements $a''$ and $b''$, not shown, beads 36 of a plastic, normally non-hardening, sealing compound are applied beneath the raised Van Buren ears $g$ (FIG. 44), and then these ears are closed down against and secured to the adjacent narrow side walls $c$ and $d$, (FIG. 45), thus confining the sealing compound in sealing relation to any voids which might be present at such flap ends and thereby providing sift-proof, vermin-proof and moisture and vapor tight seals (FIG. 46).

For facility in breaking the seal, and opening the end closure, the narrow side walls $c$ and $d$ may be provided with non-penetrating lines 37 for their fracture adjacent to the edges of the Van Buren ears, so that by pressing inward upon these ears the portions of the walls adhered to them will break away.

In FIGS. 47 to 49 a further embodiment of the invention is shown, in which its practice can be particularly adapted to cartons of the "outside glue flap," or "outside glue lap," type, or other types in which a raw edge of a carton wall, rather than a raw edge of a glue flap, is exposed interiorly of the carton.

As shown in FIG. 47, the free edge of the broad side wall b is provided with an outward extension 39 skived at 40 and eventually treated with an impregnating adhesive or the like, indicated by the stippling 41, as are the glue flaps hereinbefore described. This extension is joined to the broad side wall b along a folding score 42.

At the opposite end of the blank, namely at the free edge of the narrow side wall c, there is provided an outside glue flap e'' defined therefrom by a folding score 43.

In assembling this blank to flat-folded and glued form, adhesive is applied to the outer face of the extension 39 and to the skived portion thereof, as indicated at 41, and to the inner face of the glue flap e'', as indicated by the stippling 44, FIG. 48. Then the broad side wall b, with its extension 39, is folded on the folding score 45 over, and flat upon, the narrow side wall d and broad side wall a. Thereafter, the narrow side wall c with its glue flap e'' is folded on the folding score 46 over, and flat against, the extension 39, with its glue flap e'' against the underlying area of the broad side wall b. Pressure applied in the area of the narrow side wall c overlying the extension 39, and to the glue flap e'', will cause these parts to be adhesively secured to the narrow side wall c, and to the broad side wall b, respectively, with the folding scores 42 and 43 in operative alignment (FIG. 49). Thus, the edge of the broad side wall b which is disposed within the carton will be protected against wicking and the like by the skived and properly treated extension 39.

In FIGS. 50 to 52 there is shown a modification of the practice of the invention illustrated in FIGS. 47 to 49, but similarly related to carton blanks in which the edge of an element other than the glue flap is skived and repellently treated.

In this embodiment, also, the glue flap e''', which is an outside glue flap, is attached to the free edge of the narrow side wall c along a folding score 47, and at the opposite end of the blank the free edge of the broad side wall b is skived at 48 and repellently treated, as indicated by the stippling 49. As shown, this skiving extends over the end flaps b' and b'' as well as along the edge of the broad side wall b, but, is desired, the skiving may be so controlled as to be confined to the edge of the broad side wall.

In assembling this blank to flat-folded and glued form, adhesive is applied to the skived edge 48 of the outer face of the broad side wall b, as indicated by the stippling 49 (FIGS. 50 and 51), and to the inner face of the glue flap e''', as indicated by the stippling 50 (FIG. 51). Then the broad side wall b is folded on the folding score 51 over, and flat upon, the narrow side wall d and broad side wall a (FIG. 51). Thereafter, the narrow side wall c with its attached glue flap e''' is folded on the folding score 52 over and down against the broad side wall a, with its glue flap e''' overlying and adhesively secured to a complemental area of the broad side wall b, including the skived repellently treated edge 48 thereof, and with the folding score 47 in substantial alignment with the terminal 53 of such edge (FIG. 52).

In accordance with this treatment and arrangement of parts it will be apparent that the raw edge terminal 53 of the broad side wall b which is exposed within the carton presents a repellently treated surface.

It will be understood that the treatment of the extension 39 (FIGS. 47 to 49) and of the edge portion of the broad side wall b (FIGS. 50 to 52), may follow any of the representative methods illustrated, respectively, in FIGS. 1 to 4, 5 to 11, 12 to 18, 19 to 22, and 23 to 26.

Obviously, the carton blanks of FIGS. 47 to 49 and FIGS. 50 to 52 are of the type in which the end flaps of a broad side wall (a as shown) are provided with Van Buren ears g, and may be closed and sealed in accordance with the practice covered by the hereinbefore referred to Patent No. 3,007,376, and illustrated in FIGS. 44 to 46.

From the foregoing it will be seen that the invention may be practiced in the fabrication of carton blanks for a variety of styles or types of cartons, those specifically illustrated being representative only, and that, no matter what the style or type of carton may be, the blank therefor may be cut from sheet material, such as paperboard, which has a liner of appropriate character previously applied thereto, it being possible in accordance with the practice of the invention to remove from selected areas of the blank increments of the material of such depth or caliper as will best serve the purposes intended.

Various changes and modifications are considered to be within the principle of the invention and the scope of the following claims.

What we claim is:

1. The method of treating the bibulous fibres adjacent to a raw edge portion of an element of a carton blank formed from sheet material such as paperboard, which comprises the steps of:
    (a) removing from such edge-adjacent portion an increment of the thickness of such sheet material substantially in the plane of the element and less than its full thickness to thereby expose in a thus-produced substantially planar interior surface of the blank the said bibulous fibres thereof, and
    (b) applying to the thus exposed fibres a coating of a substance which will seal the fibres against imbibition.

2. The method as defined in claim 1, in which the sheet material of the carton blank is provided on one of its faces with a substantially impervious liner layer of a material repellent to oil, grease, moisture and vapor and which ultimately constitutes the interior surfaces of the carton, and said increment of the thickness of said sheet material is removed inwardly from the face thereof opposite that carrying said liner layer, the depth of removal of said increment terminating short of the proximate surface of said liner layer and thus leaving upon such liner layer surface a remainder of fibres of the blank.

3. The method as defined in claim 1, in which the said element of the carton blank is a glue flap, and the sealing substance is an adhesive applied to the said glue flap and serves not only to seal the said fibres against imbibition but also to affix the said glue flap to a juxtaposed complemental element of the carton blank.

4. The method as defined in claim 1, in which the sheet material of the carton blank is provided on one of its faces with a substantially impervious liner layer of a material repellent to oil, grease, moisture and vapor and which ultimately constitutes the interior surface of the carton, and said increment of the thickness of said sheet material is removed from an edge-adjacent portion of said element of the blank inwardly from the face thereof opposite that carrying said liner layer to a depth to approach but not reach the proximate surface of said liner layer in an area extending to the terminal edge of said element and thus leaving upon such liner layer surface a remainder of fibres of the blank, the additional steps of folding the thus treated area of the liner layer with the fibres left intact therewith over upon and securing it to said opposite face of the element prior to the affixing of said element to a complemental part of the carton blank.

5. The method as defined in claim 1, in which the sheet material of the carton blank is provided on one of its faces with a substantially impervious liner layer of a material repellent to oil, grease, moisture and vapor and which ultimately constitutes the interior surfaces of the carton, and said increment of the thickness of said sheet material is removed inwardly from the face thereof opposite that carrying said liner layer to a depth to approach but not reach the proximate surface of said liner layer in an area extending to the terminal edge of said element of the carton blank and thus leaving upon such liner layer surface a remainder of fibres of the blank, the additional steps of folding the thus treated area of the liner layer with the fibres left intact therewith over upon itself and thus securing it by action of the applied adhesive substance prior to the affixing of said element to a complemental part of the carton blank.

6. The method of treating an element of a carton blank formed from sheet material such as paperboard to seal the bibulous fibres thereof against imbibition, which comprises the steps of:
   (a) removing from said element in an area thereof adjacent to its terminal edge a longitudinally extending increment substantially in the plane of the element and less thickness than the full thickness of said element to provide a channel spaced from but substantially paralleling said terminal edge and thereby exposing on its substantially planar surface the bibulous fibres, and
   (b) applying to the thus exposed fibres a coating of a substance which will seal the fibres against imbibition.

7. The method of treating an element of a carton blank formed from sheet material such as paperboard provided on its ultimate inner face with a substantially impervious liner layer of a material repellent to oil, grease, moisture and vapor and serving to seal the bibulous fibres of the blank against imbibition, and assembling such blank in flat-folded carton-forming condition, which comprises the steps of:
   (a) removing from said element in an area adjacent to and including its longitudinal terminal edge an increment of the planar thickness of said element to a depth proximate to but short of said liner layer to thus provide a relatively thin extension on said terminal edge and expose the bibulous fibres of the sheet material left integral with the liner layer of said terminal edge extension,
   (b) applying to the thus exposed fibres a coating of a substance which will seal the fibres against imbibition, and
   (c) adhesively securing said element and its terminal edge extension to a complemental part of the carton blank.

8. A carton formed from sheet material such as paperboard comprising a plurality of elements including side walls and end-closure flaps, two of said side walls being adhesively connected by a glue flap, a liner of a substantially impervious material repellent to oil, grease, moisture and vapor carried on the interior faces of said side walls, end-closure flaps and glue flap to provide a barrier against oil, grease, moisture and vapor penetration, one of said elements normally having a raw cut edge which exposes the bibulous fibres of the sheet material to the interior of the carton, and means for sealing the last-named element against imbibition of grease, oil, moisture or vapor, through such exposed fibres, said sealing means comprising adjacent to the face of said last-named element opposite said liner carrying face a sub-surface area lying substantially in the plane of the element and in which the bibulous fibres of the element are exposed in such plane, the thus exposed fibres of the sub-surface area being coated with an imbibition preventing substance.

9. A carton as defined in claim 8, in which said sub-surface area is in the form of a portion of said liner layer with adhered bibulous fibres and initially extending beyond the terminal edge of said last-named element but folded thereover upon and secured to the face of said element opposite that carrying the liner layer.

10. The method of treating the bibulous fibres adjacent to a raw edge portion of an element of a carton blank formed from sheet material such as paperboard and provided on its ultimate inner face with a substantially impervious liner layer which comprises the steps of:
   (a) removing from such edge-adjacent portion a substantially planar increment of the material of the blank sufficient to expose the fibers thereof at said edge and proximate to said liner layer while preserving said liner layer substantially intact, and
   (b) applying to the thus exposed fibres a coating of a substance which will seal the fibres against imbibition.

References Cited by the Examiner
UNITED STATES PATENTS

| | | | |
|---|---|---|---|
| 695,273 | 3/02 | Bernie et al. | 229—14 |
| 1,698,532 | 1/29 | Brooks. | |
| 1,866,230 | 7/32 | Stubbs. | |
| 1,956,159 | 4/34 | Reilly et al. | |
| 1,980,180 | 11/34 | Bergstein | 229—48 X |
| 2,152,323 | 3/39 | Moore. | |
| 2,237,809 | 4/41 | Bronson | 229—3.1 |
| 2,275,063 | 3/42 | Moore | 229—3.1 X |
| 2,415,323 | 2/47 | Wilcox | 229—3.1 X |
| 2,496,043 | 1/50 | Farrell. | |
| 2,506,056 | 5/50 | Bergstein | 229—48 X |
| 2,959,336 | 11/60 | Mosse et al. | 229—48 X |
| 2,983,421 | 5/61 | Turpin | 229—14 X |
| 2,996,235 | 8/61 | Turpin | 229—37 |
| 3,007,376 | 11/61 | Hickin | 229—37 X |
| 3,093,287 | 6/63 | Stark | 229—3.1 |
| 3,099,378 | 7/63 | Schroeder | 229—48 X |

JOSEPH R. LECLAIR, *Primary Examiner.*
GEORGE O. RALSTON, *Examiner.*

UNITED STATES PATENT OFFICE

CERTIFICATE OF CORRECTION

Patent No. 3,198,416                                             August 3, 1965

Robert J. Hickin et al.

It is hereby certified that error appears in the above numbered patent requiring correction and that the said Letters Patent should read as corrected below.

Column 5, line 16, for "FIG." read -- FIGS. --; column 6, line 27, after "it" insert -- may be in the form of a coating which bonds externally with, --; line 33, for "linear" read -- liner --; column 7, line 20, after "ends" insert -- with --; column 9, line 45, for "abrosive" read -- abrasive --; line 67, after "flap" insert -- either --; column 10, line 17, after "stippling" insert -- 29 --; line 22, after "tab" insert -- 23 --; line 23, for "ball" read -- wall --; column 12, line 46, for "ini" read -- in --; column 13, line 43, for "is" read -- if --; column 14, line 7, for "appropirate" read -- appropriate --.   Signed and sealed this 18th day of January 1966.

(SEAL)
Attest:

ERNEST W. SWIDER                                          EDWARD J. BRENNER
Attesting Officer                                              Commissioner of Patents